United States Patent
Bunin

(10) Patent No.: US 11,052,870 B2
(45) Date of Patent: *Jul. 6, 2021

(54) SWITCH ASSEMBLY FOR VEHICLE SEAT BELT BUCKLE

(71) Applicant: CTS Corporation, Lisle, IL (US)

(72) Inventor: Gregory Bunin, Lake Zurich, IL (US)

(73) Assignee: CTS Corporation

( * ) Notice: Subject to any disclaimer, the term of this patent is extended or adjusted under 35 U.S.C. 154(b) by 0 days.

This patent is subject to a terminal disclaimer.

(21) Appl. No.: 17/029,565

(22) Filed: Sep. 23, 2020

(65) Prior Publication Data

US 2021/0001803 A1 Jan. 7, 2021

Related U.S. Application Data

(63) Continuation of application No. 16/032,230, filed on Jul. 11, 2018, now Pat. No. 10,787,150.

(51) Int. Cl.
*B60R 22/48* (2006.01)
*B60R 21/015* (2006.01)
*G01D 5/14* (2006.01)
*G01D 11/24* (2006.01)

(52) U.S. Cl.
CPC ........ *B60R 22/48* (2013.01); *B60R 21/01532* (2014.10); *G01D 5/145* (2013.01); *G01D 11/245* (2013.01); *B60R 21/01546* (2014.10); *B60R 2022/4816* (2013.01)

(58) Field of Classification Search
CPC .............. B60R 22/48; B60R 21/01532; B60R 21/01546; B60R 2022/4816
See application file for complete search history.

(56) References Cited

U.S. PATENT DOCUMENTS

| | | |
|---|---|---|
| 4,738,325 A | 4/1988 | Bullivant et al. |
| 5,752,299 A | 5/1998 | Vivacqua et al. |
| 5,839,174 A | 11/1998 | Chamings et al. |
| 5,960,523 A | 10/1999 | Husby et al. |
| 5,966,784 A | 10/1999 | Arbogast et al. |
| 6,002,325 A | 12/1999 | Conaway et al. |
| 6,175,304 B1 | 1/2001 | Becker |
| 6,205,629 B1 | 3/2001 | Becker |
| 6,205,868 B1 | 3/2001 | Miller et al. |
| 6,474,435 B1 | 11/2002 | Devereaux |
| 6,554,318 B2 | 4/2003 | Kohut et al. |

(Continued)

FOREIGN PATENT DOCUMENTS

WO 2011/053011 A2 5/2011

OTHER PUBLICATIONS

TRW Type-F Buckle—2018.

*Primary Examiner* — Faye M Fleming
(74) *Attorney, Agent, or Firm* — Daniel Deneufbourg

(57) ABSTRACT

A switch assembly for a vehicle seat belt buckle comprising a switch housing defining an interior and a pocket, a cable extending into the interior and including hook-shaped ends extending around posts in the interior of the switch housing. In one embodiment, the interior of the switch housing includes first and second posts positioned in a co-linear and spaced apart relationship and the hook-shaped ends face each other and extend around the first posts and abut against the second posts. In one embodiment, the Hall Effect sensor is positioned in the pocket of the switch housing in an inclined relationship.

11 Claims, 4 Drawing Sheets

(56) References Cited

U.S. PATENT DOCUMENTS

| | | |
|---|---|---|
| 6,574,119 B2 | 6/2003 | Kaltenbach |
| 6,640,648 B2 | 11/2003 | Chamings et al. |
| 6,725,727 B2 | 4/2004 | Rogers, Jr. et al. |
| 6,931,696 B2 | 8/2005 | Lee |
| 7,014,005 B2 | 3/2006 | Martinez et al. |
| 7,116,220 B2 | 10/2006 | Almaraz |
| 9,650,016 B2 | 5/2017 | Andreen |
| 10,787,150 B2 * | 9/2020 | Bunin ................ G01D 11/245 |
| 2003/0060997 A1 | 3/2003 | Ilyes |
| 2003/0209088 A1 | 11/2003 | Sullivan |
| 2011/0115480 A1 | 5/2011 | Babin |
| 2012/0056737 A1 | 3/2012 | Magdun |

* cited by examiner

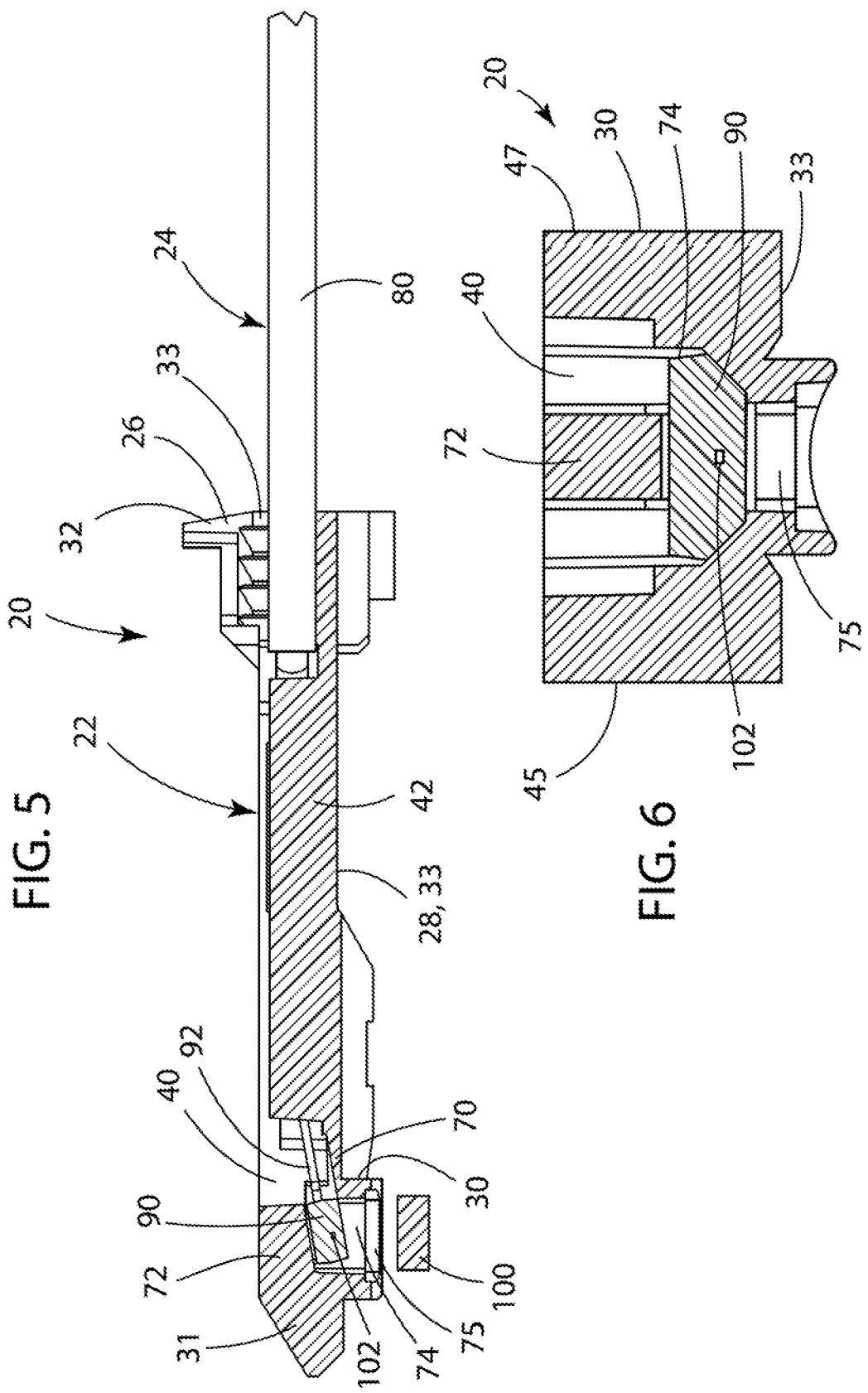

SWITCH ASSEMBLY FOR VEHICLE SEAT BELT BUCKLE

CROSS-REFERENCE TO RELATED APPLICATIONS

This patent application is a continuation application which claims priority and benefit of the filing date of U.S. patent application Ser. No. 16/032,230 filed on Jul. 11, 2018, the disclosure and contents of which is expressly incorporated herein in its entirety by reference.

FIELD OF THE INVENTION

This invention relates to vehicle seat belt buckle and, more specifically, to a switch assembly for a vehicle seat belt buckle.

BACKGROUND OF THE INVENTION

Vehicle seat belt buckles incorporate switch assemblies adapted to signal the coupling or decoupling of the seat belt. Switch assemblies incorporate magnet/Hall Effect sensor assemblies in which the magnet is located on the seat belt buckle, the Hall Effect sensor is located in the switch housing, and buckling and unbuckling of the seat buckle generates changes in magnetic field which are sensed by the Hall Effect sensor for signaling whether the occupant has secured or removed his/her seat belt.

The present invention is directed to a new and improved switch assembly for such a vehicle seat belt buckle.

SUMMARY OF THE INVENTION

The present invention is directed to a switch assembly for a vehicle seat belt buckle comprising a switch housing defining an interior with a pocket, a cable extending into the interior of the switch housing, and a Hall Effect sensor located in the pocket of the switch housing in an inclined relationship and including terminals coupled to the cable.

In one embodiment, the switch housing includes interior posts, the cable including ends coupled to the interior posts and the terminals of the Hall Effect sensor being coupled to the ends of the cable.

In one embodiment, the ends of the cable are hook-shaped and extend around the interior posts.

The present invention is also directed to a switch assembly for a vehicle seat belt buckle comprising a switch housing defining an interior including a pocket and posts, a cable extending into the interior of the switch housing and including ends coupled to the posts in the switch housing, and a sensor located in the pocket of the switch housing, the sensor including terminals coupled to the ends of the cable.

In one embodiment, the ends of the cable are hook-shaped ends wrap around the posts in the interior of the switch housing.

In one embodiment, first and second posts are positioned in a spaced apart and co-linear relationship, the hook-shaped ends of the cable face each other and wrap around the first posts and abut against the second posts.

In one embodiment, the sensor is a Hall Effect sensor located in the pocket in an inclined relationship.

The present invention is further directed to a switch assembly for a vehicle seat belt buckle comprising a switch housing defining an interior including a pocket and posts, a cable extending into the interior of the switch housing and including hook-shaped ends coupled to the posts in the switch housing, and a Hall Effect sensor located in the pocket in the interior of the switch housing and including terminals coupled to the hook-shaped ends of the cable.

In one embodiment, first and second posts are positioned in a co-linear and spaced apart relationship, the hook-shaped ends of the cable facing each other and extending around the first posts and abutting against the second posts.

In one embodiment, the cable includes first and second wires including first and second hook-shaped ends respectively and including a pair of first and second posts positioned in a co-linear and spaced apart relationship on opposed sides of and spaced from a central wall in the interior of the housing, the first and second hook-shaped ends extending around the first posts respectively and abutting the second posts respectively.

In one embodiment, the Hall Effect sensor is located in the pocket in the interior of the switch housing in an inclined relationship.

Other advantages and features of the present invention will be more readily apparent from the following detailed description of the preferred embodiments of the invention, the accompanying drawings, and the appended claims.

BRIEF DESCRIPTION OF THE DRAWINGS

These and other features of the invention can best be understood by the description of the accompanying FIGS as follows:

FIG. 5 is a partly broken enlarged vertical cross-sectional view of the switch assembly taken along the line 5-5 in FIG. 3; and FIG. 6 is an enlarged vertical cross-sectional view of the switch assembly taken along the line 6-6 in FIG. 3.

DESCRIPTION OF THE EMBODIMENT

Figure 1:
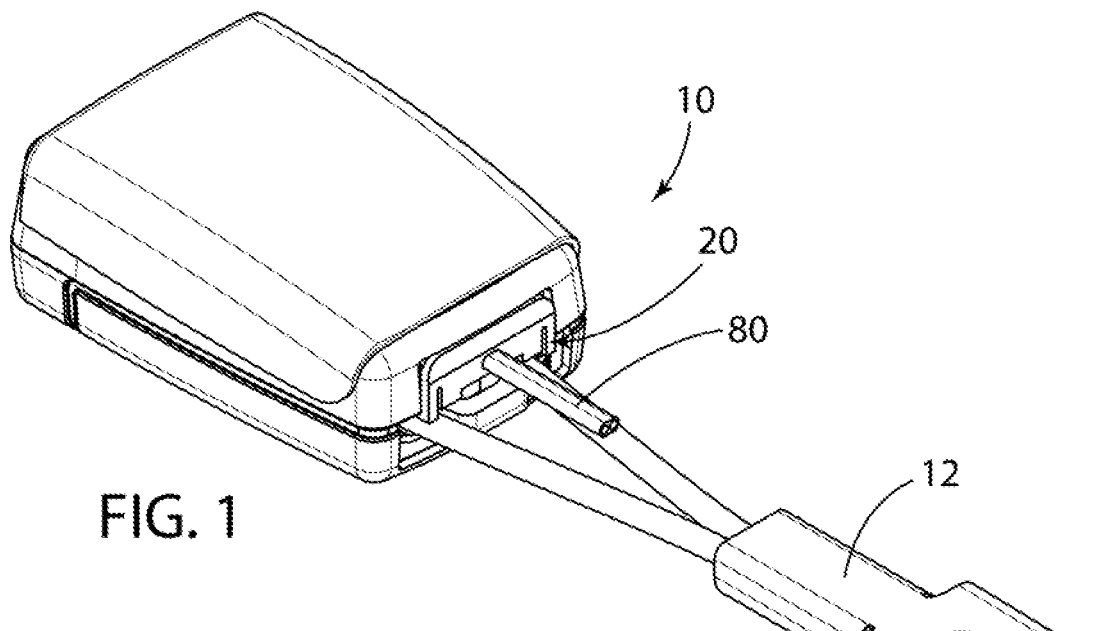
FIG. 1 is a partly broken perspective view of a vehicle seat belt buckle including a switch assembly in accordance with the present invention.
Figure 2:
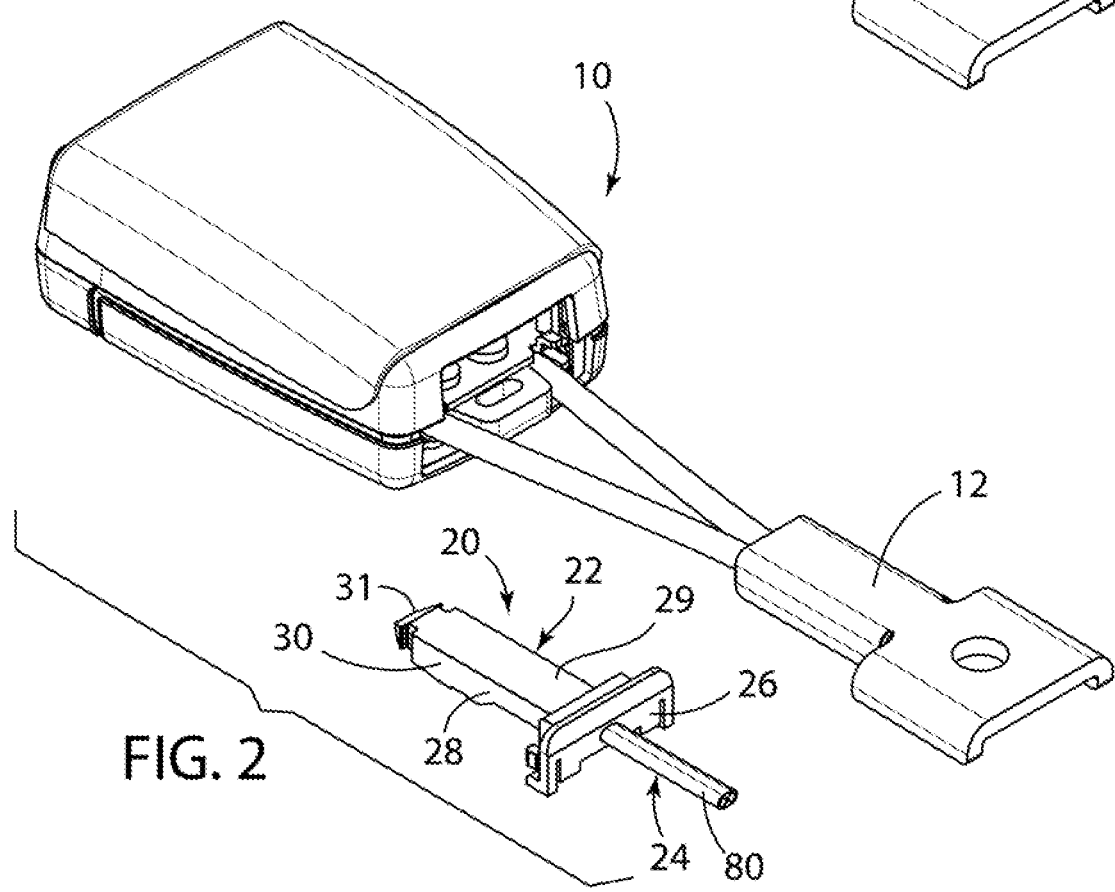
FIG. 2 is a partly broken perspective view of the vehicle seat belt buckle shown in FIG. 1 with the switch assembly removed therefrom.

FIGS. 1 and 2 depict a vehicle seat belt buckle 10 with an associated cable 12 and incorporating a switch assembly 20 in accordance with the present invention.

FIG. 1 shows the switch assembly 20 extending into the interior of the vehicle seat belt buckle 10 while FIG. 2 shows the switch assembly 20 separated and disconnected from the vehicle seat belt buckle 10.

The switch assembly 20 as shown in particular detail in FIGS. 3, 4, 5, and 6, comprises a generally "T" shaped switch assembly housing 22 which houses a cable/wiring assembly 24 and a Hall Effect integrated circuit (IC) sensor 90. The housing 22 is made of any suitable molded plastic material and includes a proximal clip portion 26 defining the top of the "T", an elongate middle or central cable/wiring housing portion 28 unitary with and extending generally normally outwardly from the clip portion 26 and defining the base or leg of the "T", a Hall Effect sensor housing portion 30 unitary with and co-linear with the central cable/wire housing portion 28, and a distal tip 31 unitary with and extending co-linearly outwardly from the Hall Effect sensor housing portion 30.

The clip portion 26 includes a pair of outwardly extending wings 32 and 34 and defines a central through aperture 33 located between the wings 32 and 34 and adapted to receive the cable/wire 80 of the cable/wiring assembly 24. Each of the wings 32 and 34 includes a pair of distal clip fingers 36 and 38 adapted to allow for clipping and securing of the switch assembly 20 within the interior of the vehicle seat belt buckle 10.

The central cable/wire housing portion 28 of the switch assembly housing 22 includes a plurality of walls including a lower/bottom horizontal base wall 33 and a pair of opposed vertical side walls 45 and 47 together defining an interior elongate housing cavity or recess 40.

A plurality of walls/posts extend upwardly normally from the interior surface of the bottom horizontal wall 33 of the housing 22 and into the interior housing cavity or recess 40 including a central elongate wall 42 extending generally centrally co-linearly with the longitudinal axis of the switch assembly housing 22; a pair of diametrically opposed walls 44 and 46 located on opposed sides of, generally parallel to, and spaced from the central wall 42; a first pair of posts 48 and 50 located on one side of, generally parallel to, and spaced from the central wall 42; and a second pair of posts 52 and 54 located on the other side of, generally parallel to, and spaced from the central wall 42 in a relationship diametrically opposed to the first pair of posts 48 and 50 and further in a relationship co-linear and spaced from the walls 44 and 46 respectively.

The walls 44 and 46 are located proximate and spaced from the proximal clip portion 26 of the housing 22. The posts 48, 50, 52, and 54 are located proximate the Hall Effect sensor housing portion 30 and distal tip 31 of the housing 22.

Each of the walls 44 and 46 includes a jagged or serrated or saw tooth shaped exterior surface 44a and 46a respectively. Each of the side walls 45 and 47 of the housing 22 includes respective jagged or serrated or saw tooth shaped interior portions 45a and 47a located opposite and spaced from the respective walls 44 and 46 and, more specifically, located opposite and spaced from the respective jagged or serrated or saw tooth shaped exterior surfaces 44a and 46a thereof respectively.

Each of the walls 44 and 46 is located between and spaced from the central wall 42 and the respective opposed housing side walls 45 and 47 so as to define respective generally curvilinearly shaped elongate recesses or apertures or receptacles 60 and 62 on opposite sides of and spaced from the central wall 42 and positioned relative to each other and the central wall 42 in a diametrically opposed and parallel relationship on opposed sides of the central wall 42.

The posts 48 and 50 are spaced from each other in the longitudinal direction so as to define a recess or opening 51a therebetween. The posts 52 and 54 are spaced from each other in the longitudinal direction so as to define a recess or opening 53a therebetween and diametrically opposed to the recess or opening 51a.

The posts 48 and 50 are further positioned on one side of and spaced from the central wall 42 in a relationship forming and defining a recess 51b between the exterior housing wall 45 and the posts 48 and 50 and a recess 51c between the posts 48 and 50 and the central wall 42.

In a like manner, the posts 52 and 54 are positioned on the opposed transverse side of and spaced from the central wall 42 in a relationship forming and defining a recess 53b between the exterior housing wall 47 and the posts 52 and 54 and a recess 53c between the posts 52 and 54 and the housing side wall 47. The recesses 51b and 51c and the recesses 53b and 53c are positioned in a diametrically opposed relationship on opposite sides of the central wall 42.

The switch assembly housing 22 and, more specifically, the Hall Effect sensor housing portion 30 thereof, includes a wall 70 protruding unitarily upwardly from the interior surface of the bottom housing wall 33 into the interior cavity 40. The top exterior surface of the wall 70 is angled and slopes outwardly and downwardly in the direction of the distal tip 31 and the bottom housing wall 33.

The switch assembly housing 22 and, more specifically, the Hall Effect sensor housing portion 30 thereof, also includes an upper wall 72 spaced from the lower inclined wall 70 and defining therebetween an interior open pocket 74 in the interior housing cavity 40 adapted for receiving and housing the Hall Effect sensor 90 in a relationship with the Hall Effect sensor 90 positioned therein in a sloped or angled relationship and seated on and extending outwardly from an edge of the wall 70.

The switch assembly housing 22 and, more specifically, the Hall Effect sensor housing portion 30 thereof, also defines a bottom through opening 75 that allows for the molding of the interior wall 72 during the forming of the switch assembly housing 22.

The distal tip 31 of the switch assembly housing 22 includes a plurality of exterior angled surfaces including opposed angled exterior diametrically opposed top and bottom surfaces 31a and 31b and opposed angled exterior diametrically opposed side surfaces 31c and 31d. All of the surfaces 31a, 31b, 31c, and 31d all angle or slope inwardly from the Hall Effect sensor housing portion 30 in the direction of and towards the distal end of the distal tip 31.

The surfaces 31a, 31b, 31c, and 31d are adapted for guiding the switch assembly 20 into the interior of the seat belt buckle when the switch assembly 20 is inserted and secured into the seat belt buckle 10 during assembly.

The cable 80 of the cable/wire assembly 24 is composed of and includes a pair of elongate electrical wires 82 and 84 terminating in respective generally curvilinear or hook-shaped distal terminal ends 82a and 84a respectively.

The Hall Effect sensor 90 includes a pair of elongate electrical terminals 92 and 94 extending outwardly therefrom.

The cable/wire assembly 24 is located and seated within the interior cavity 40 of the switch housing 22 in a relationship with the cable 84 extending through the through aperture 33 defined in the base 26 of the switch housing 22; the wires 80 and 82 extending through the respective recesses 60 and 62 defined in the central portion of the housing 22; and the hook-shaped distal ends 82a and 84a extending and hooked around the respective posts 48 and 52 and extending through and located in the housing recesses 51a, 51b, and 51c and the recesses 53a, 53b, and 53c respectively for securing the wires 82 and 84 in the interior cavity 40 of the switch assembly housing 22.

Figure 3:
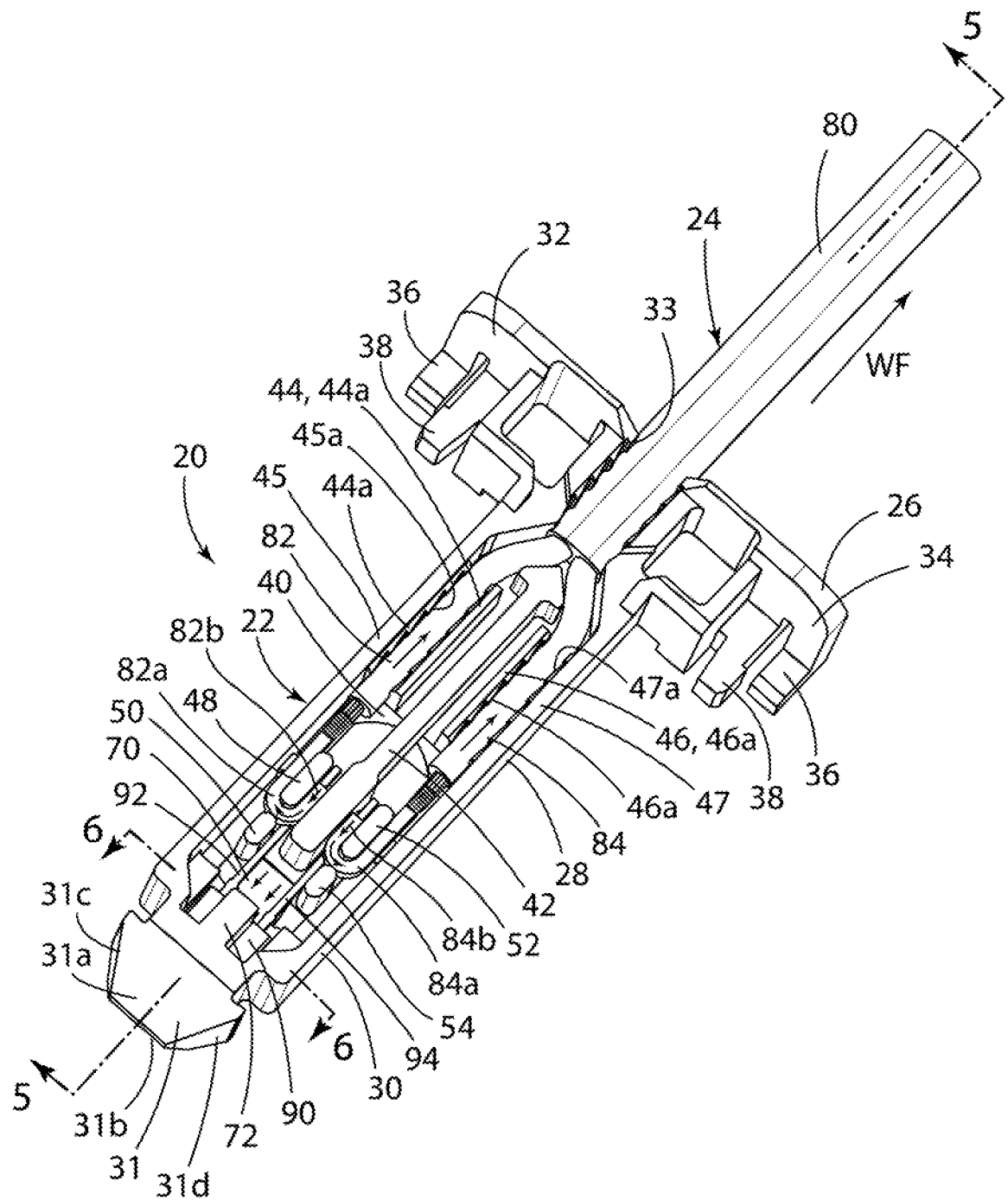
FIG. 3 is a partly broken enlarged top perspective view of the switch assembly of the present invention with the over molded cover removed therefrom.
Figure 4:
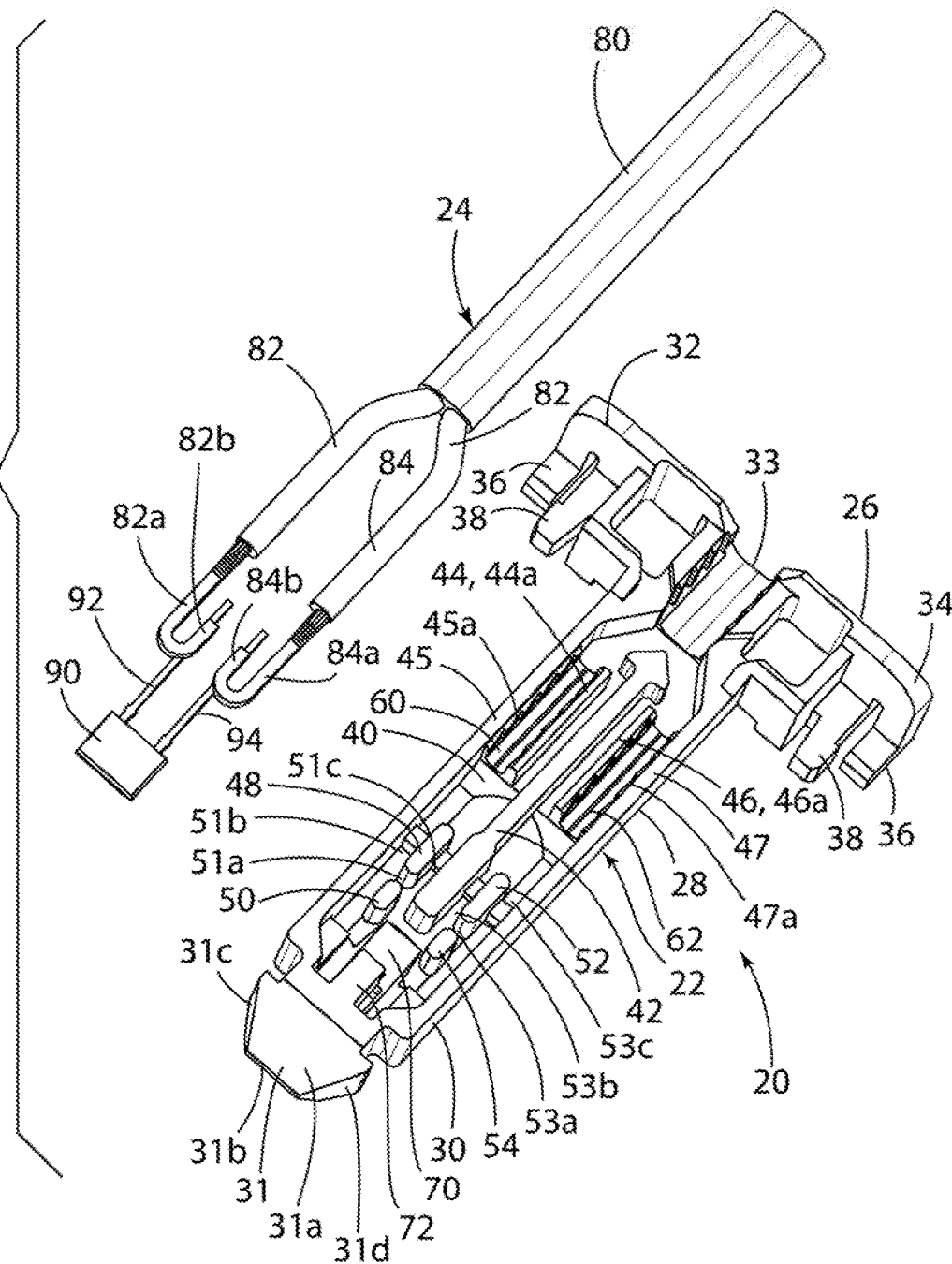
FIG. 4 is a partly broken enlarged top perspective view of the switch assembly shown in FIG. 3 with the Hall Effect sensor and associated wiring separated and exploded from the switch assembly housing.

As more particularly shown in FIG. 3, the hook-shaped ends 82a and 84a are positioned and nestled in place in the interior of the switch housing 22 in a relationship with the interior side surfaces thereof abutting against and extending around the exterior side surface of the respective posts 48 and 52 and the exterior side surfaces thereof abutting against the exterior side surfaces of the central wall 42 and the respective posts 50 and 54. Thus, the posts 48, 50, 52, and 54 in combination with the central wall 42 hold the wire ends 82a and 84a firmly in place and against movement in the interior of the switch housing 22. Still more specifically as shown in FIG. 3, the hook-shaped ends 82a and 84a are positioned and nestled in place in the interior of the switch housing 22 in a relationship with the distal free ends 82b and 84b of the respective hook-shaped ends 82a and 84a nestled in the respective recesses 51c and 53c defined between the respective posts 48 and 52 and the central wall 42 and, still more specifically, in a relationship with the exterior side face of the respective distal free ends 82b and 84b of the respective hook-shaped ends 82a and 84a facing and abutting against the opposed exterior side surfaces of the central housing wall 42 and the respective posts 52 and, still more specifically, in a relationship with the distal free ends 82b and 84b facing each other and separated from each other by the central housing wall 42. Thus, in the embodiment of FIG. 3, the hook-shaped ends 82a and 84a are positioned and located in a relationship facing each other and the central housing wall 42.

The Hall Effect sensor 90 is located and seated in the interior cavity 40 of the switch assembly housing 22 in a relationship with the Hall Effect sensor 90 located in the pocket 74 defined in the distal Hall Effect sensor housing portion 30 of the switch assembly housing 22 and further in a relationship with the distal end of the respective electrical terminals 92 and 94 extending from the Hall Effect sensor 90 rearwardly in the direction of the central housing portion 28 and still more specifically in a relationship with the free distal ends of the respective Hall Effect sensor terminals 92 and 94 extending into the respective recesses 51c and 53c defined between the respective posts 48 and 52 and the central wall 42 and then coupled to, as by soldering or the like, to the hook-shaped distal ends 82a and 84a respectively of the wires 80 and 82 respectively of the electrical cable 84.

Still more specifically, the free distal ends of the respective Hall Effect sensor terminals 92 and 94 are coupled to, as by soldering or the like, to the underside of the free distal ends 82b and 84b of the respective hook-shaped distal ends 82a and 84a and, still more specifically, are coupled together in a relationship in which the terminals 92 and 94 and the free distal ends 82b and 84b are oriented and positioned in an abutting and overlying co-linear and co-planar relationship.

After the cable assembly 24 and Hall Effect sensor 90 have been located within the interior of the switch housing 22 as described above, plastic material 29 is over molded into the interior cavity 40 of the switch housing 22 for retaining and securing the cable assembly 24 and Hall Effect sensor 90 in the interior of the switch housing 22.

The switch housing 22 and more specifically the structure of the interior cavity 40 thereof and still more specifically the structure thereof defining the pocket 74 for the Hall Effect sensor 90 eliminates the need for the Hall Effect sensor 90 to be mounted on a separate printed circuit board and the respective terminals 92 and 94 thereof allow the Hall Effect sensor 90 to be coupled electrically directly to the wires 82 and 84 of the cable 80 via the hook-shaped ends 82a and 84a respectively.

Moreover, locating the Hall Effect sensor 90 in the switch housing 22 at an angle or inclined relationship relative to the switch housing longitudinal axis and still more specifically at an angle or incline relative to the magnet 100, shown in simplified form in FIG. 5 but understood to be located in the interior of the seat belt buckle 10, provides for an optimal position of the sensor element 102 located in the interior of the Hall Effect sensor 90 relative to the magnet 100.

Still further, the combination of the walls, recesses, posts, and pockets defined in the interior of the switch housing 22 and as described above in detail in combination provide and define structure for securely positioning and electrically connecting the cable wires 80 and 82, the Hall Effect sensor 90, and the Hall Effect terminals 92 and 94.

In particular, the jagged or serrated surfaces 44a, 45a, 46a, and 47a on the respective walls 44, 45, 46, and 47 advantageously prevent the movement of the respective wires 82 and 84 once located in the respective recesses 60 and 62 thus preventing the decoupling of the hook-shaped ends 82a and 84a thereof from the respective Hall Effect sensor terminal ends 92 and 94 during assembly or use.

Additionally, the use of wires 82 and 84 with respective hook-shaped ends 82a and 84a which are wrapped/extended around or hooked to respective posts 48 and 52 formed in the interior of the switch housing 22 and abutted against the respective posts 50 and 54 and the central wall 42 also provides for a secure coupling of the Hall Effect sensor terminals 92 and 94 to the respective hook-shaped ends 82a and 84a of the respective wires 82 and 84 and eliminates the risk of decoupling of the same from each other due to the normal stresses applied thereto during assembly and use.

Particularly, the use of wires with hook-shaped ends 82a and 84a wrapped around respective posts 48 and 52 in a relationship with the hook-shaped ends 82a and 84a facing each other eliminates the risk of decoupling of the Hall Effect sensor terminals 92 and 94 from the respective free ends 82b and 84b in the event of the application of a force on the cable 80 sufficient to cause the movement of the cable 80 rearwardly away from the buckle 20.

Still more specifically, and as shown in FIG. 3, it is understood that the application of a withdrawal force on the cable 80 rearwardly away from the buckle 20 and generally designated by the arrow WF in FIG. 3, would result in the movement of the respective wires 82 and 84 rearwardly in the direction of the clip portion 26 which in turn would result in the respective clockwise and counter-clockwise rotation of the respective hook-shaped wire ends 82a and 84a about the respective posts 48 and 52 which in turn would result in the forward movement of the respective free ends 82b and 84b of the respective hook-shaped ends 82a and 84b in the direction of the distal tip 31 of the switch housing 31 which, in turn, would result in the forward movement of the Hall Effect sensor terminals 92 and 94 coupled thereto also in the direction of the distal tip 31 of the switch housing 22 which, in turn, would result in the forward movement of the Hall Effect sensor 90 in the interior pocket 74 of the switch housing 22. Thus, it is understood that the use of wires with hook-shaped ends 82a and 84a facing each other and wrapped around respective posts 48 and 52 advantageously results, in the event of the application of a withdrawal force on the cable 80, in the combined and joint movement of the wire ends 82a and 84a and Hall Effect terminals 92 and 94, rather than the undesirable decoupling of the Hall Effect terminals 92 and 94 from the respective wire ends 82a and 84a.

Numerous variations and modifications of the switch assembly for a vehicle seat belt buckle as described above may be effected without departing from the spirit and scope of the novel features of the invention. It is to be understood that no limitations with respect to the specific switch assembly for the vehicle seat belt buckle illustrated herein are intended or should be inferred. It is, of course, intended to cover by the appended claims all such modifications as fall within the scope of the claims.

What is claimed is:

1. A switch assembly comprising:
   a switch housing defining a longitudinal axis and an interior;

a cable extending into the interior of the switch housing; and a sensor located in the interior of the switch housing in an angled relationship relative to the longitudinal axis of the switch housing and coupled to the cable.

2. The switch assembly of claim 1 wherein the switch housing includes interior posts, the cable including ends coupled to the interior posts and the sensor including terminals coupled to the ends of the cable.

3. The switch assembly of claim 2 wherein the cable includes hook-shaped extending around the interior posts.

4. A switch assembly comprising:
a switch housing including a bottom wall and defining an interior including posts extending upwardly from the bottom wall of the switch housing;
a cable extending into the interior of the switch housing and coupled to the posts in the switch housing; and
a sensor located in the interior of the switch housing and coupled directly to the cable.

5. The switch assembly of claim 4 wherein the cable includes ends that wrap around the posts in the interior of the switch housing.

6. The switch assembly of claim 5 including first and second spaced apart posts in the interior of the switch housing, the cable including hook-shaped ends facing each other and wrapping around the first posts and abutting against the second posts.

7. The switch assembly of claim 4 wherein the sensor is a Hall Effect sensor located in the interior of the switch housing.

8. A switch assembly comprising:
a switch housing defining an interior including a pocket and posts;
a cable extending into the interior of the switch housing and including hook-shaped ends coupled to the posts in the switch housing; and
a Hall Effect sensor located in the pocket in the interior of the switch housing and including terminals coupled to the hook-shaped ends of the cable.

9. The switch assembly of claim 8 including first and second posts positioned in a co-linear and spaced apart relationship, the hook-shaped ends of the cable facing each other and extending around the first posts and abutting against the second posts.

10. The switch assembly of claim 8 wherein the cable includes first and second wires including first and second hook-shaped ends respectively and including a pair of first and second spaced apart posts on opposed sides of and spaced from a central wall in the interior of the housing, the first and second hook-shaped ends extending around the first posts respectively and abutting the second posts respectively.

11. The switch assembly of claim 8 wherein the Hall Effect sensor is located in the pocket in the interior of the switch housing in an inclined relationship.

* * * * *